J. A. Hafner,

Horse Power.

N° 83,059. Patented Oct. 13, 1868.

Witnesses:
Leopold Buck
A W Mary

Inventor:
John A Hafner
per Alexander Mason
Atty

JOHN A. HAFNER, OF COMMERCE, MISSOURI.

Letters Patent No. 83,059, dated October 13, 1868.

IMPROVEMENT IN HORSE-POWERS.

The Schedule referred to in these Letters Patent and making part of the same.

*To all whom it may concern:*

Be it known that I, JOHN A. HAFNER, of Commerce, in the county of Scott, and in the State of Missouri, have invented certain new and useful Improvements in Horse-Power Connections; and do hereby declare that the following is a full, clear, and exact description thereof, reference being had to the accompanying drawings, and to the letters of reference marked thereon.

The nature of my invention consists in applying a spring between the shaft and wheel or clutch on a horse-power, so that the draught of the team is gradually obtained when the spring is compressed, permitting the horse-power to move first, and then the machine which it operates.

In order to enable others skilled in the art to which my invention appertains to make and use the same, I will now proceed to describe its construction and operation, referring to the annexed drawings, which form a part of this specification, and in which—

Figure 1:
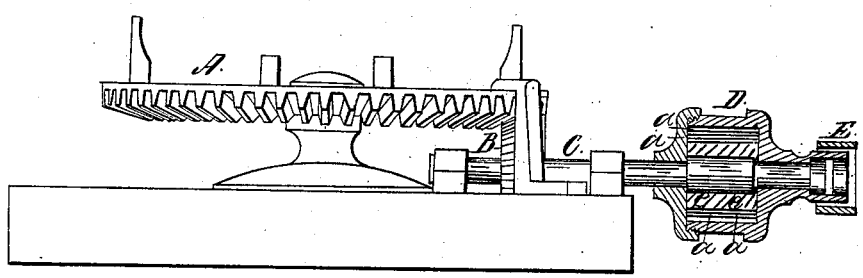
Figure 2:
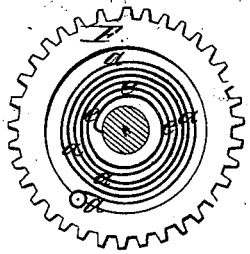

Figure 1 is a side view of a horse-power connection, showing my invention in section in a casing, and Figure 2 a cog-wheel in section, with my invention applied.

A represents the bevel master-wheel of a horse-power, to which the team is attached. This wheel gears with a pinion, B, on the shaft C, the outer end of which enters a casing, D, to which latter the joint E, connecting the horse-power with some machine, is attached, or it may form a part thereof.

A spring, $a$, is placed inside of the casing D, connecting the casing with the shaft C; one end of the said spring being secured to the shaft and the other to the casing. The spring is wound around the shaft before being secured to the casing, and a rubber spring, $e$, is wound around the inner coils of the spring $a$. By this means the spring $a$ is supported, and the strain on the same will not be so great as it otherwise would be, making the spring $a$ last a great deal longer and saving expense.

It will be seen that when the horse-power is started, it operates first on the springs, and as soon as the spring is, so to say, completely wound up, it turns the casing, and operates the machine to which it is connected.

Instead of placing the springs in a casing, as above described, I may place it in a cog-wheel, F, fig. 2, which then would connect, in some suitable manner, with the machine; and if the wheel is large, I form a casing for the spring around the hub, the spokes extending from the outside of the casing to the outer ring of the wheel.

I am aware that a horse-power, with a shaft passing through a casing, provided with a coiled spring, and connecting with a joint, is not new.

What I claim, and desire to secure by Letters Patent, is—

The combination of the shaft C, wheel F, (or casing D,) and coiled spring $a$, when said spring is provided with an interior coiled rubber spring, $e$, to support the exterior spring, and relieve the strain thereon, all substantially as shown and described.

In testimony that I claim the foregoing, I have hereunto set my hand, this 1st day of September, 1868.

JOHN A. HAFNER.

Witnesses:
GEORGE W. ARNOLD,
CHARLES B. MESSMER.